US012366843B2

(12) United States Patent
Jahr

(10) Patent No.: US 12,366,843 B2
(45) Date of Patent: Jul. 22, 2025

(54) 3D PRINTING METHOD

(71) Applicant: IN-VISION Technologies AG, Guntramsdorf (AT)

(72) Inventor: Wiebke Jahr, Vienna (AT)

(73) Assignee: IN-VISION Technologies AG, Guntramsdorf (AT)

( * ) Notice: Subject to any disclaimer, the term of this patent is extended or adjusted under 35 U.S.C. 154(b) by 177 days.

(21) Appl. No.: 18/238,633

(22) Filed: Aug. 28, 2023

(65) Prior Publication Data

US 2024/0094703 A1      Mar. 21, 2024

(30) Foreign Application Priority Data

Sep. 15, 2022   (EP) ..................................... 22195785

(51) Int. Cl.
*B33Y 10/00*  (2015.01)
*B29C 64/124*  (2017.01)
(Continued)

(52) U.S. Cl.
CPC ........ *G05B 19/4099* (2013.01); *B29C 64/124* (2017.08); *B29C 64/393* (2017.08);
(Continued)

(58) Field of Classification Search
None
See application file for complete search history.

(56) References Cited

U.S. PATENT DOCUMENTS 9,649,814 B2 *   5/2017   Yeh ....................... B29C 64/393
2020/0361152 A1   11/2020   Shusteff et al.
(Continued)

FOREIGN PATENT DOCUMENTS

WO    2022171704 A1   8/2022

OTHER PUBLICATIONS

Extended European Search Report for European Patent Application No. 22195785.5 (6 Pages).

*Primary Examiner* — Yung-Sheng M Tsui
(74) *Attorney, Agent, or Firm* — Eversheds Sutherland (US) LLP

(57) ABSTRACT

A volumetric 3D printing method for producing a three-dimensional object starting from a three-dimensional template object that is made of a virtual object material. The method includes: a) providing (i) projection images that are two-dimensional light distributions of pixels, and projections of the template object in various respective projection directions, (ii) a projection device configured to sharply image the projection images in a specified depth of field range about a focal plane in an irradiation direction, and (iii) a container that contains a photosensitive substance configured to cure in areas in which a light intensity threshold value is exceeded; and b) imaging the projection images so that the light intensity threshold value of the light-sensitive substance is exceeded in the areas that correspond to the three-dimensional object to be produced. The individual projection images are imaged in different angular positions, and when in an angular position the extension of the object to be produced along the irradiation direction of the projection device in this angular position is at least twice as large as the specified depth of field range, the focal plane is displaced relative to the container such that at least one-half of the extension of the three-dimensional object to be produced, along the particular irradiation direction in the particular angular position is covered by the depth of field range.

13 Claims, 4 Drawing Sheets

(51) Int. Cl.
*B29C 64/393* (2017.01)
*B33Y 50/02* (2015.01)
*G05B 19/4099* (2006.01)

(52) U.S. Cl.
CPC ............... *B33Y 10/00* (2014.12); *B33Y 50/02* (2014.12); *G05B 2219/35134* (2013.01)

(56) References Cited

U.S. PATENT DOCUMENTS

2022/0088873 A1\* 3/2022 Voit ..................... B33Y 30/00
2022/0347929 A1\* 11/2022 Delrot ................... B33Y 10/00

\* cited by examiner

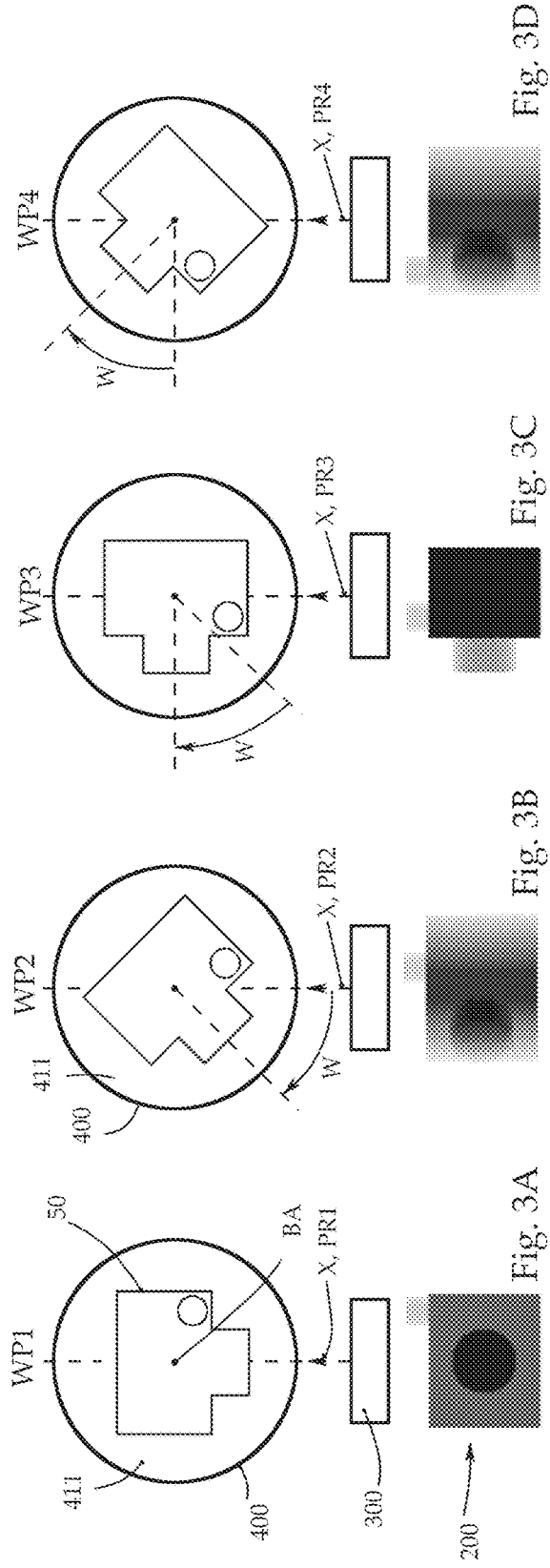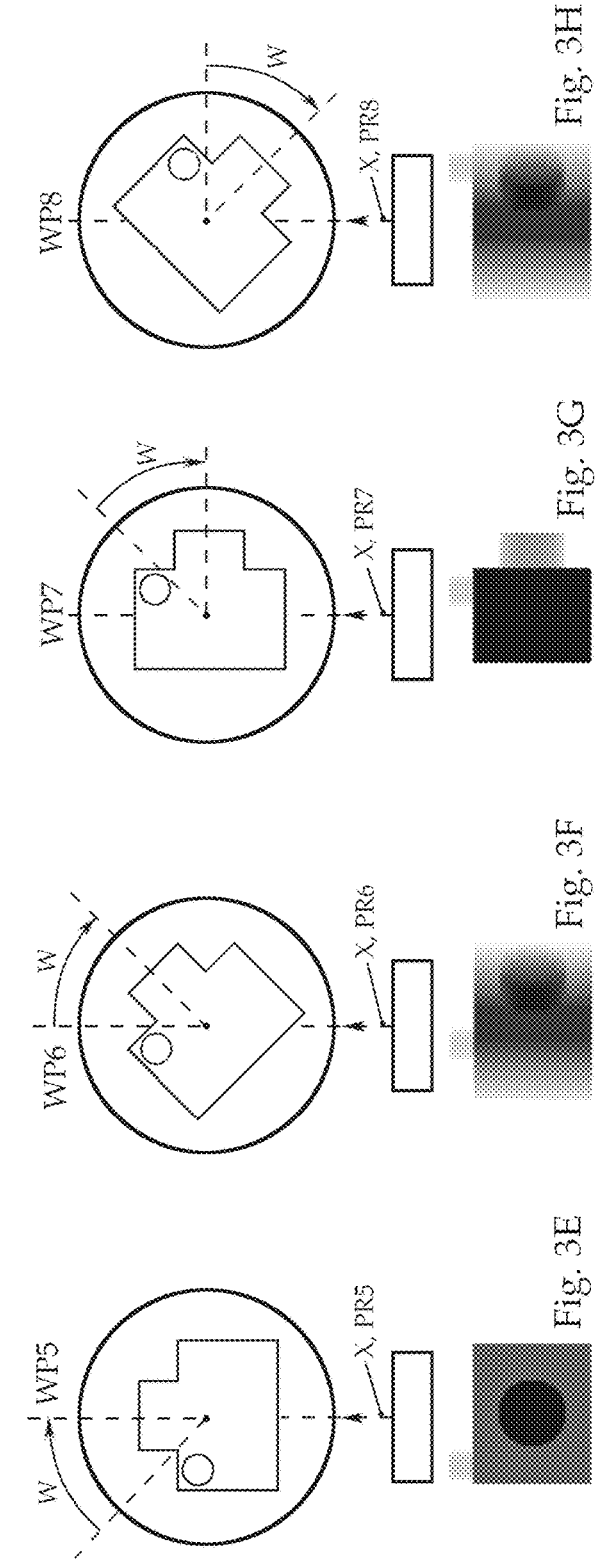

3D PRINTING METHOD

CROSS-REFERENCE TO RELATED APPLICATIONS

This application claims priority to European Patent Application No. 22195785.5, filed Sep. 15, 2022, which is incorporated herein by reference.

FIELD OF THE INVENTION AND DESCRIPTION OF PRIOR ART

The invention relates to a volumetric 3D printing method for producing a three-dimensional object starting from a three-dimensional template object that is made of a virtual object material, the method comprising the following steps:

a) providing
- at least one memory, projection images of the template object being stored in the at least one memory, the projection images being two-dimensional light distributions of pixels, for example in rows and columns, the projection images corresponding to projections of the template object in various respective projection directions about a specified object axis, the projection directions of the projection images extending orthogonally with respect to the specified object axis,
  wherein the brightness of a pixel of a projection image corresponds to the summed virtual object material of the template object, starting from the pixel, along the projection direction of the corresponding projection image in such a way that the brightness of a pixel is proportional to its summed virtual object material,
- at least one projection device that is configured to sharply image the projection images of the template object in front of the at least one projection device in a specified depth of field range about a focal plane in an irradiation direction of the at least one projection device, and
- a container that contains a photosensitive substance, the photosensitive substance being designed to cure in areas in which a light intensity threshold value is exceeded, b) imaging the projection images into the photosensitive substance present in the container by means of the at least one projection device, so that the light intensity threshold value of the light-sensitive substance is exceeded in the areas that correspond to the three-dimensional object to be produced, the individual projection images in each case being imaged into the photosensitive substance in different angular positions about a specified container axis, wherein the irradiation direction of the projection device in an angular position corresponds to the projection direction of the projection image of the template object that is imaged in the angular position, c) removing the cured three-dimensional object to be produced from the container.

In volumetric 3D printing methods from the prior art, the size or extension of the three-dimensional object to be produced is limited by the depth of field range of the projection devices, since the light intensity with which the projection images are imaged must be sufficiently high, which, however, is achievable only with a fairly large aperture opening and a resulting narrow depth of field range.

In the prior art, the aperture of the at least one projection device is therefore usually fixed, and results in an interplay of the light intensity of the light source of the projection device and the desired depth of field or depth of focus. As a result of the fixed aperture, the depth of field range is also fixed and inherently limited.

The depth of field range is a function of the square of the size of the pixels, with typical size ranges of 100 mm for a 100-μm pixel size, 1 mm for a 10-μm pixel size, and 10 μm for a 1-μm pixel size; i.e., the more precise the desired printing (i.e., the smaller the desired pixels), the greater the impact of the limiting depth of focus, thus preventing production of a larger object.

As a result, using conventional methods from the prior art, the object to be produced necessarily may have a maximum size or extension of typically a few 10 mm, depending on the implementation up to one or two times the depth of field.

SUMMARY OF THE INVENTION

Therefore, the object of the present invention is to provide a method that eliminates the disadvantages of the prior art and allows larger objects to be produced.

This object is achieved in that in step b), when in an angular position the extension of the three-dimensional object to be produced along the irradiation direction of the at least one projection device in this angular position is at least twice as large as the specified depth of field range, the focal plane is displaced relative to the container in such a way that at least one-half of the extension of the three-dimensional object to be produced, along the particular irradiation direction in the particular angular position, is covered by the depth of field range.

It is noted that during the imaging of the projection images, the light intensity is also proportional to the summed virtual object material, so that those locations with a greater sum of virtual object material compared to other locations have a higher light intensity during the imaging.

The projection images may preferably be obtained via a Radon transform.

It is pointed out that if insufficient energy in the form of light intensity passes into the light-sensitive substance to adequately cure the three-dimensional object to be produced, a repetition of step b) may then optionally be provided until the object to be produced in the light-sensitive substance is cured.

It may be provided that the light-sensitive substance is a light-sensitive resin, for example made up of a photopolymer and a photoinitiator. For example, gelatin methacrylate (gelMA) dissolved in phosphate-buffered saline solution (PBS); bisphenol A glycerolate diacrylate (BPAGDA); poly(ethylene glycol) diacrylate (PEGDA); or pentaerythritol tetraacrylate (PETA) may be used for the photopolymer. For example, lithium phenyl-2,4,6-trimethylbenzoylphosphinate (LAP); camphorquinone (CQ), ethyl-4-dimethylaminobenzoate (EDAB) with co-initiator; tris(2,2-bipyridyl)dichlororuthenium(II) hexahydrate (Ru) and sodium persulfate (SPS); 3,4-epoxycyclohexylmethyl 3,4-epoxycyclohexanecarboxylate (EEC); phenyl-bis(2,4,6-trimethylbenzoyl) phosphine oxide; or bis(η5-2,4-cylcopentadien-1-yl)-bis(2,6-difluoro-3-(1H-pyrrol-1-yl)phenyl)titanium (trade name: Irgacure 784, BASF) may be used as photoinitiator.

It may be provided that exactly one projection device is provided in step a).

It may be provided that for the imaging of the projection images by the at least one projection device in the particular angular positions, the container is rotated about the container axis.

It may be provided that for the imaging of the projection images by the at least one projection device in the particular angular positions, the at least one projection device is rotated about the container axis.

It may be provided that the displacement of the focal plane in the particular angular positions takes place by moving the container relative to the at least one projection device, in particular by linearly moving the container along the irradiation direction of the at least one projection device.

It may be provided that the displacement of the focal plane in the particular angular positions takes place by moving the at least one projection device relative to the container, in particular by linearly moving the projection device along the irradiation direction of the at least one projection device.

It may be provided that the displacement of the focal plane in the particular angular positions takes place by adjusting a focus or a focal length of the at least one projection device.

It may be provided that the displacement of the focal plane takes place via a spiral movement of the container and/or of the projection device.

It may be provided that the different angular positions in which the projection images are imaged are spaced apart from one another by 0.5° to 5°.

It may be provided that the projection directions of the projection images about the specified object axis extend at defined equal intervals relative to one another, preferably at intervals of 0.5° to 5°, in particular 0.5°.

It may be provided that in step b) the imaging of the projection images into the container in the different projection directions takes place continuously or progressively.

BRIEF DESCRIPTION OF THE DRAWINGS

The invention is explained in greater detail below with reference to drawings as examples. In the drawings:

FIGS. 3A-3H show schematic illustrations of a sequence of a volumetric 3D printing method, the individual projection images of the template object from FIG. 2 being imaged into a container in different angular positions by means of a projection device, the angular positions corresponding to the corresponding projection direction of the projection images, and in the example shown the container being rotated relative to the projection device.

DETAILED DESCRIPTION OF EMBODIMENTS OF THE INVENTION

Figure 1:
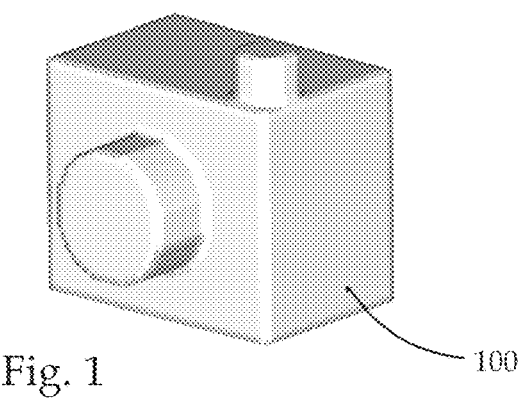
FIG. 1 shows a perspective view of an example of a three-dimensional template object that is made of a virtual object material, the intent being to produce a three-dimensional object, starting from this template object, by means of a volumetric 3D printing method.

The figures show a schematic sequence of a volumetric 3D printing method for producing a three-dimensional object 50, starting from a three-dimensional template object 100 that is made of a virtual object material, and shown in a perspective view in FIG. 1.

The method includes the provision of at least one memory in a first step a), projection images 200 of the template object 100 being stored in the at least one memory.

The projection images 200 are two-dimensional light distributions of pixels in rows and columns, the projection images 200 corresponding to projections of the template object 100 in the various respective projection directions PR1-PR8 about a specified object axis OA, the projection directions PR1-PR8 of the projection images 200 extending orthogonally with respect to the specified object axis OA.

Figure 2A:
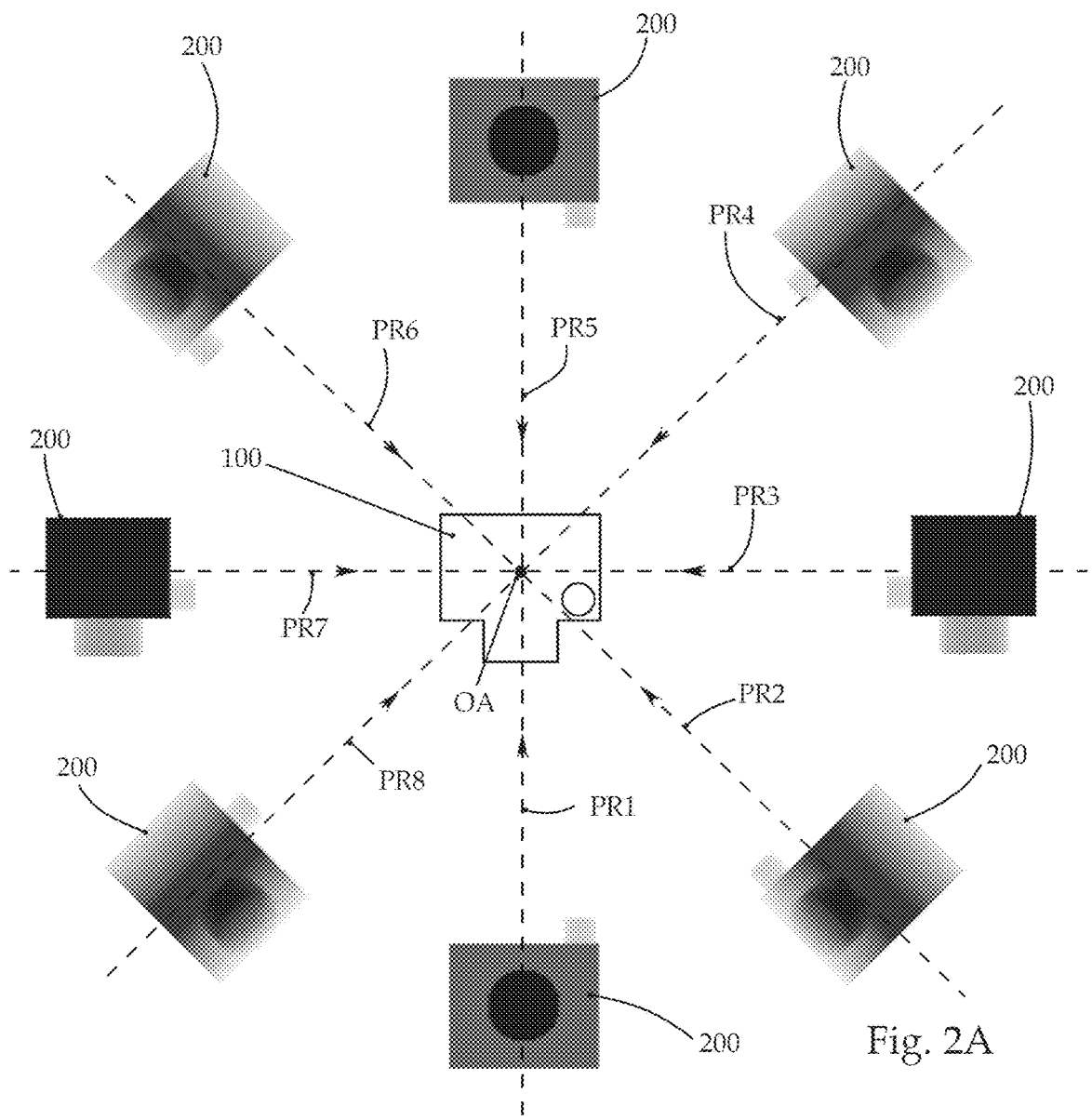
FIG. 2A shows the template object from FIG. 1 in a view from above, two-dimensional projection images being imaged around an object axis in various projection directions, and representing projection images of the template object in the particular projection direction.

FIG. 2A shows the template object 100 in a view from above, projection images 200 being present around the specified object axis OA at equal angular intervals of 45°. Strictly for a simplified illustration, the angular interval between the projection directions PR1-PR8 is 45° in the example shown, and may preferably also be 0.5° to 5°, in particular 0.5°.

It is noted that the illustrated projection images 200 in FIG. 2A are actually perpendicular to the plane of the drawing. However, the present illustration has been selected for better clarity and understandability.

The brightness of a pixel of a projection image 200 corresponds to the summed virtual object material of the template object 100, starting from the pixel, along the projection direction PR1-PR8 of the corresponding projection image 200 in such a way that the brightness of a pixel is proportional to its summed virtual object material.

Figure 2B:
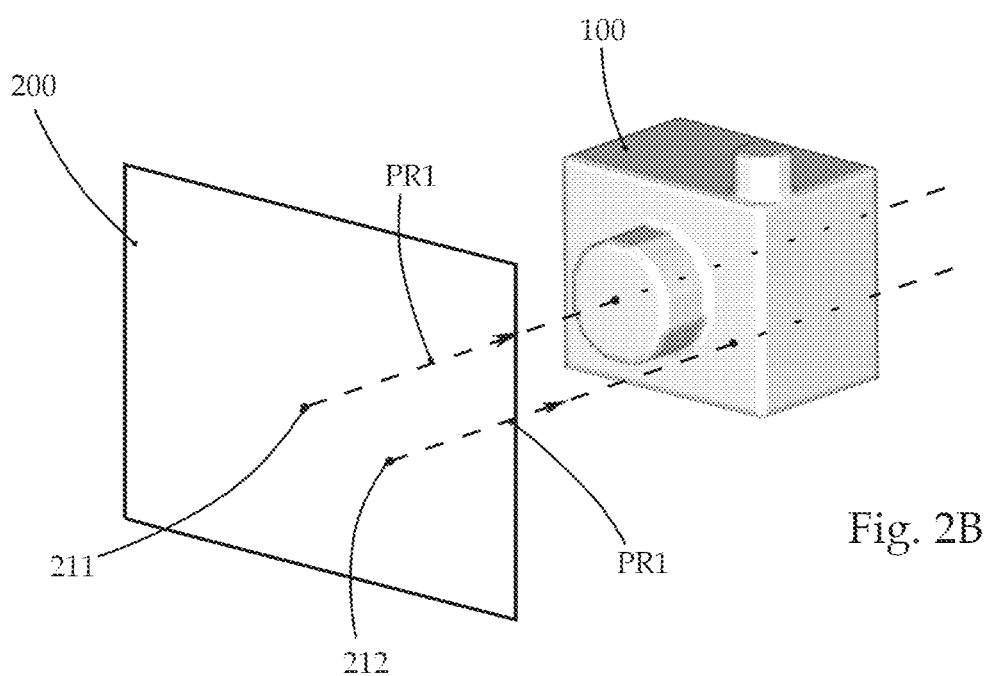
FIG. 2B shows an example of a projection image with examples of pixels, the virtual object material of the template object being summed, starting from the particular pixels in the projection direction of the projection image.

FIG. 2B shows an example of a projection image 200, two pixels 211, 212 being depicted by way of example. The corresponding projection image and projection direction are also depicted in FIG. 2A. Starting from the particular pixels 211, 212 in the projection direction PR1 of the projection image, the virtual object material is summed as previously described. In the example shown in FIG. 2B, the sum of the virtual object material, starting from the pixel denoted by reference numeral 211, is greater than the sum starting from the pixel denoted by reference numeral 212. Therefore, in the examples shown, the pixel with reference numeral 211 is illustrated more darkly in the projection image than the pixel with reference numeral 212. It is noted that the illustration may also have the converse appearance; i.e., the pixels with a larger sum of the summed virtual object material are lighter than the pixels having a comparatively smaller sum.

The so-called Radon transform may also be used as a preferred method for creating the individual projection images 200.

Also in the example shown, a projection device 300 is provided which is configured to sharply image the projection images 200 of the template object 100 in front of the at least one projection device 300 in a specified depth of field range ST about a focal plane F, in an irradiation direction X of the at least one projection device 300. During the imaging of the projection images 200, the light intensity is also proportional to the summed virtual object material, so that those locations or pixels with a greater sum of virtual object material compared to other locations or pixels have a higher light intensity during the imaging. With regard to the example shown in FIG. 2B, the pixel having reference numeral 211 has a higher light intensity than the pixel with reference numeral 212.

In addition, a container 400 that contains a photosensitive substance 410 is provided, the photosensitive substance 410 being designed to cure in areas in which a light intensity threshold value is exceeded. This light intensity threshold value is reached or exceeded due to the irradiation of light over a certain time period, depending on the selection of the photosensitive substance.

FIGS. 3A through 3H show a step b) of the volumetric 3D printing method, FIGS. 3A through 3H being viewed as a sequence starting with FIG. 3A. By means of the projection device 300, in step b) the projection images 200 are imaged into the photosensitive substance 410 present in the container 400, so that the light intensity threshold value of the light-sensitive substance is exceeded in the areas corresponding to the three-dimensional object 50 to be produced.

The individual projection images 200 are imaged in each case into the photosensitive substance 410 in different angular positions WP1-WP8 about a specified container axis BA, the irradiation direction X of the at least one projection device 300 in an angular position WP1-WP8 corresponding to the projection direction PR1-PR8 of the projection image 200 of the template object 100 that is imaged in the angular position WP1-WP8.

FIGS. 3A through 3H and FIGS. 4A through 4C show a simplified schematic sequence of the volumetric 3D printing method according to the invention for producing an object 50 starting from the virtual template object 100, based on an example.

FIGS. 3A through 3H in each case show the container 400 in which the light-sensitive substance, for example a resin, is situated, the container 400 being rotatable about a container axis BA. The figures in each case also show a projection device 300 that images the different projection images from previous FIG. 2A in an irradiation direction X. In FIG. 3A, the projection image 200 that corresponds to the projection direction PR1 is imaged, the container 400 with the light-sensitive substance present therein being in a first angular position WP1 relative to the projection device 300.

In a next step, apparent in FIG. 3B, the container 400 together with the resin is rotated relative to the projection device 300 about the container axis BA by an angle W, and is [in] a second angular position WP2 relative to the projection device 300. In this position of the container 400, the projection device 300 images the projection image 200 into the light-sensitive substance, which corresponds to the projection direction PR2.

It is noted that the three-dimensional object 50 to be produced is denoted in each of FIGS. 3A through 3H; this serves only as a guide for how the particular imaged projection image 200 relates to the three-dimensional object 50 to be produced.

It is thus also to be clarified that the irradiation direction of the projection device 300 in a certain angular position WP1-WP8 corresponds to the particular projection direction PR1-PR8 of the projection image 200 of the template object 100 that is imaged in the angular position.

It is further noted that for the imaging of the projection images 200 by the projection device 300 in the particular angular positions WP1-WP8, the projection device 300 may also be rotated relative to the container 400 about the container axis BA.

In addition, in step b), when in an angular position WP1-WP8 the extension of the three-dimensional object 50 to be produced along the irradiation direction X of the projection device 300 in this angular position WP1-WP8 is at least twice as large as the specified depth of field range ST, the focal plane F is displaced relative to the container 400 in such a way that at least one-half of the extension of the three-dimensional object 50 to be produced, along the particular irradiation direction X direction in the particular angular position WP1-WP8, is covered by the depth of field range ST.

One-half of the extension in an angular position is therefore sufficient, since the "other" half may be cured with an angular position rotated by 180°.

Figure 4C:
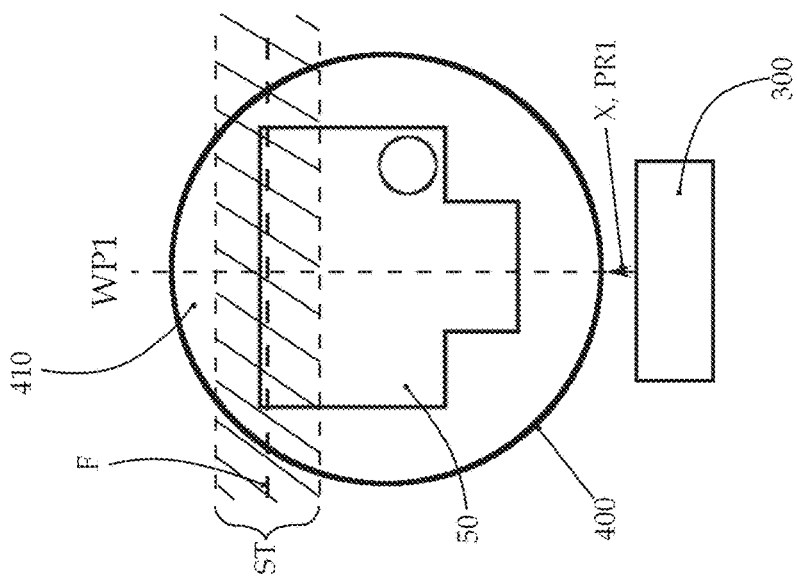
FIGS. 4A-4C show a schematic illustration of a sequence of a relative linear displacement of the projection device with respect to the container, due to the displacement a focal plane and its depth of field range of the projection device being linearly moved in the container, the linear displacement in the example shown taking place during the imaging of the projection image in FIG. 3A.
Figure 4B:
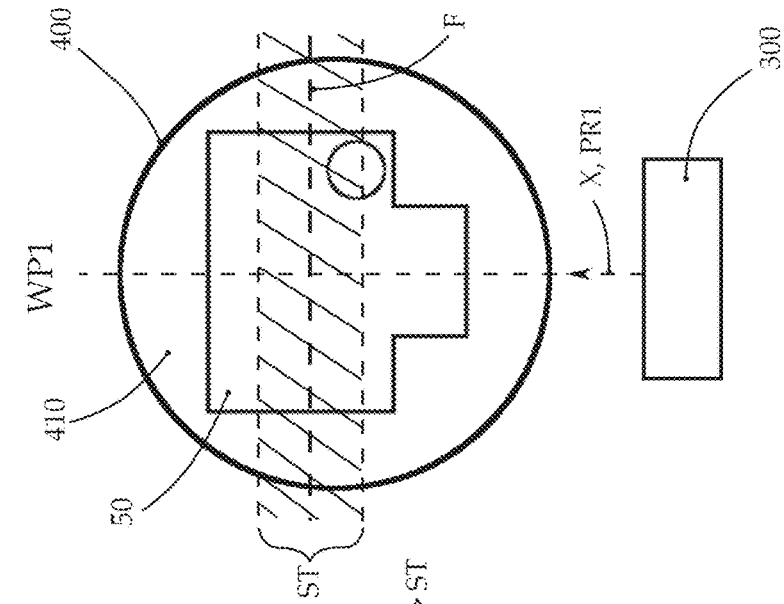
Figure 4A:
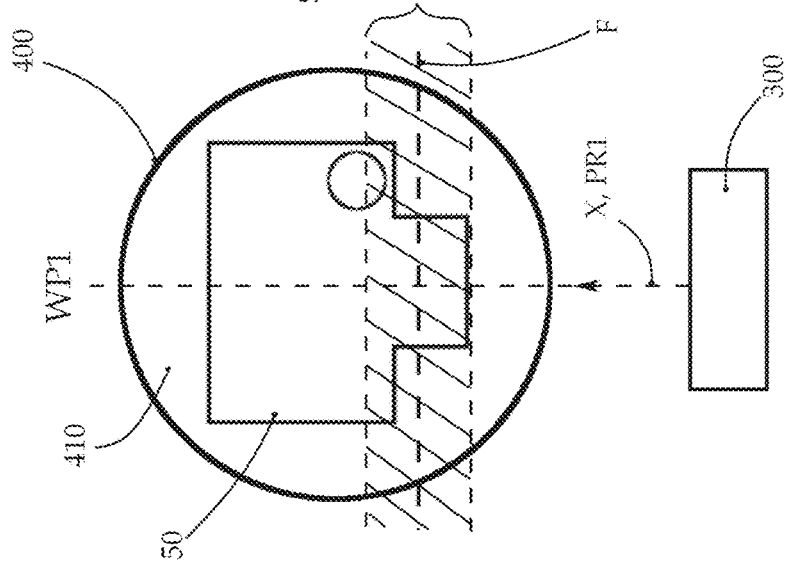

As an example, FIGS. 4A through 4C show that, starting from the first angular position WP1 in FIG. 3A, the extension of the three-dimensional object 50 to be produced along the irradiation direction X of the projection device 300 is greater than the depth of field range ST of the focal plane F. In the sequence starting from FIG. 4A to FIG. 4C, the depth of field range ST is shifted with respect to the container 400 by means of a relative linear displacement of the projection device 300 along the irradiation direction X, so that the depth of field range ST fully covers the extension of the three-dimensional object 50 to be produced in this first angular position WP1, while the corresponding projection image 200, which corresponds to the projection direction PR1, is imaged into the light-sensitive substance 410.

It is noted that the displacement of the focal plane F in the particular angular positions WP1-WP8 may also take place by moving the container 400 relative to the projection device 300, in particular by linearly moving the container along the irradiation direction X of the projection device 300.

It is likewise conceivable for the displacement of the focal plane F in the particular angular positions WP1-WP8 to take place by adjusting a focus or the focal length of the projection device 300.

The same process of displacing the depth of field range ST is likewise carried out in the further angular positions WP2-WP8, illustrated in FIGS. 3B through 3H.

After the imaging of the projection image 200 in FIG. 3H and the associated displacement of the depth of field range ST, thus, a complete pass, the three-dimensional object 50 is to be cured. If this is not the case, the pass shown in FIGS. 3A through 3H (including the particular displacement of the depth of field range ST) may be repeated any number of times.

As soon as the three-dimensional object 50 is cured, it may be removed from the container 400 in a final step c).

LIST OF REFERENCE SYMBOLS

50 three-dimensional object
100 template object
200 projection images
211, 212 pixel
300 projection device
400 container
410 light-sensitive substance
OA object axis
BA container axis
F focal plane
ST depth of field range
W angle
WP1-WP8 angular position
PR1-PR8 projection direction
X irradiation direction

The invention claimed is:

1. A volumetric 3D printing method for producing a three-dimensional object (50) starting from a three-dimensional template object (100) that is made of a virtual object material, the method comprising:
   a) providing:
      at least one memory, projection images (200) of the template object (100) being stored in the at least one memory, the projection images (200) being two-dimensional light distributions of pixels, in rows and columns, the projection images (200) corresponding to projections of the template object (100) in various respective projection directions (PR1-PR8) about a specified object axis (OA), the projection directions (PR1-PR8) of the projection images (200) extending orthogonally with respect to the specified object axis (OA), wherein the brightness of a pixel of a projection image (200) corresponds to the summed virtual object material of the template object (100), starting from the pixel, along the projection direction (PR1-PR8) of the corresponding projection image (200), in such a way that the brightness of a pixel is proportional to its summed virtual object material,
      at least one projection device (300) that is configured to sharply image the projection images (200) of the template object (100) in front of the at least one projection device (300) in a specified depth of field range (ST) about a focal plane (F) in an irradiation direction (X) of the at least one projection device (300), and
      a container (400) that contains a photosensitive substance (410), the photosensitive substance (410) being designed to cure in areas in which a light intensity threshold value is exceeded;
   b) imaging the projection images (200) into the photosensitive substance (410) present in the container (400) by means of the at least one projection device (300), so that the light intensity threshold value of the light-sensitive substance is exceeded in the areas that correspond to the three-dimensional object to be produced, the individual projection images (200) in each case being imaged into the photosensitive substance (410) in different angular positions (WP1-WP8) about a specified container axis (BA), wherein the irradiation direction (X) of the at least one projection device (300) in an angular position (WP1-WP8) corresponds to the projection direction (PR1-PR8) of the projection image (200) of the template object (100) that is imaged in the angular position (WP1-WP8); and
   c) removing the cured three-dimensional object (50) to be produced from the container (400),
      wherein in step b), when in an angular position (WP1-WP8) the extension of the three-dimensional object (50) to be produced along the irradiation direction (X) of the at least one projection device (300) in this angular position (WP1-WP8) is at least twice as large as the specified depth of field range (ST), the focal plane (F) is displaced relative to the container (400) in such a way that at least one-half of the extension of the three-dimensional object (50) to be produced, along the particular irradiation direction (X) in the particular angular position (WP1-WP8), is covered by the depth of field range (ST).

2. The method according to claim 1, wherein the light-sensitive substance (410) is a light-sensitive resin comprising a photopolymer and a photoinitiator.

3. The method according to claim 1, wherein exactly one projection device (300) is provided in step a).

4. The method according to claim 1, wherein for the imaging of the projection images (200) by the at least one projection device (300) in the particular angular positions (WP1-WP8), the container (400) is rotated about the container axis (BA).

5. The method according to claim 1, wherein for the imaging of the projection images (200) by the at least one projection device (300) in the particular angular positions (WP1-WP8), the at least one projection device (300) is rotated about the container axis (BA).

6. The method according to claim 1, wherein the displacement of the focal plane (F) in the particular angular positions (WP1-WP8) takes place by moving the container (400) relative to the at least one projection device (300) by linearly moving the container along the irradiation direction (X) of the at least one projection device (300).

7. The method according to claim 1, wherein the displacement of the focal plane (F) in the particular angular positions (WP1-WP8) takes place by moving the at least one projection device (300) relative to the container (400) by linearly moving the projection device along the irradiation direction (X) of the at least one projection device (300).

8. The method according to claim 1, wherein the displacement of the focal plane (F) in the particular angular positions (WP1-WP8) takes place by adjusting a focus or a focal length of the at least one projection device (300).

9. The method according to claim 1, wherein the different angular positions (WP1-WP8) in which the projection images (200) are imaged are spaced apart from one another by 0.5° to 5°.

10. The method according to claim 1, wherein the projection directions (PR1-PR8) of the projection images (200) about the specified object axis (OA) extend at defined equal intervals relative to one another.

11. The method according to claim 1, wherein in step b) the imaging of the projection images (200) into the container (400) in the different projection directions (PR1-PR8) takes place continuously or progressively.

12. The method according to claim 10, wherein the intervals are 0.5° to 5°.

13. The method according to claim 10, wherein the intervals are 0.5°.

* * * * *